June 1, 1965

J. H. TODT ETAL 3,186,115

ELECTRICAL APPARATUS

Filed May 31, 1961

INVENTORS
JOACHIM H. TODT,
ARTHUR H. JOHNSON
BY

Kenneth D. Siegfried
Everett J. Schroeder
THEIR ATTORNEYS

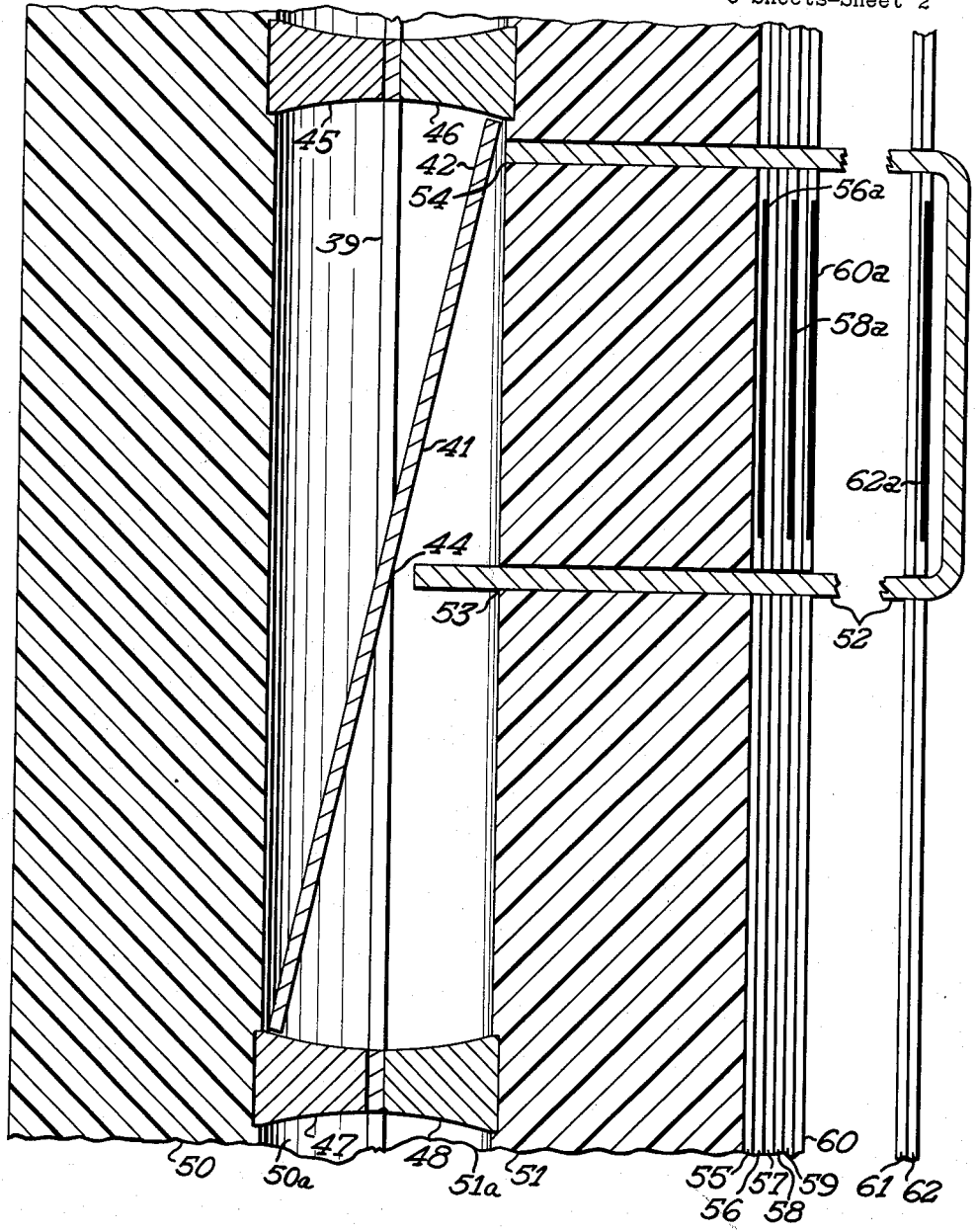

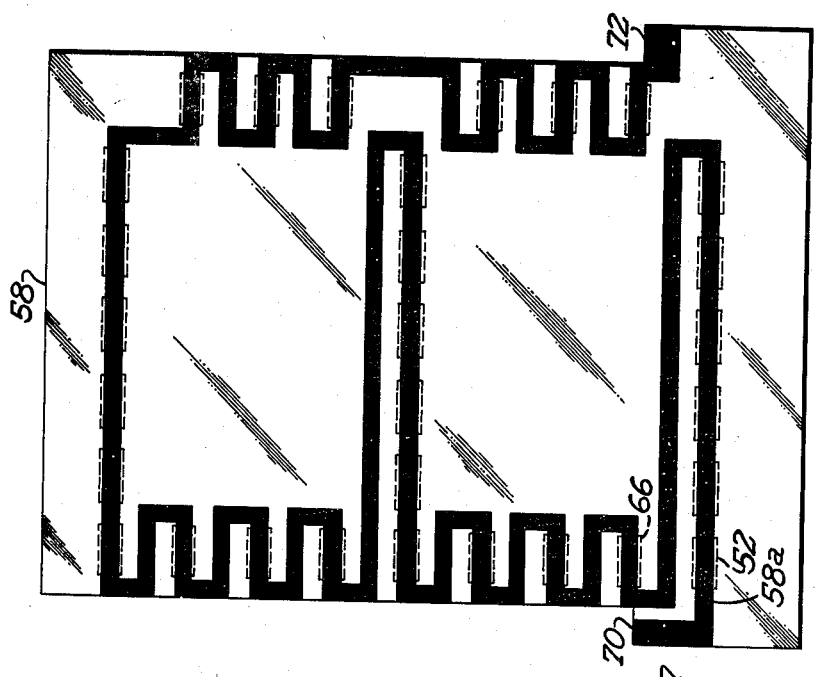
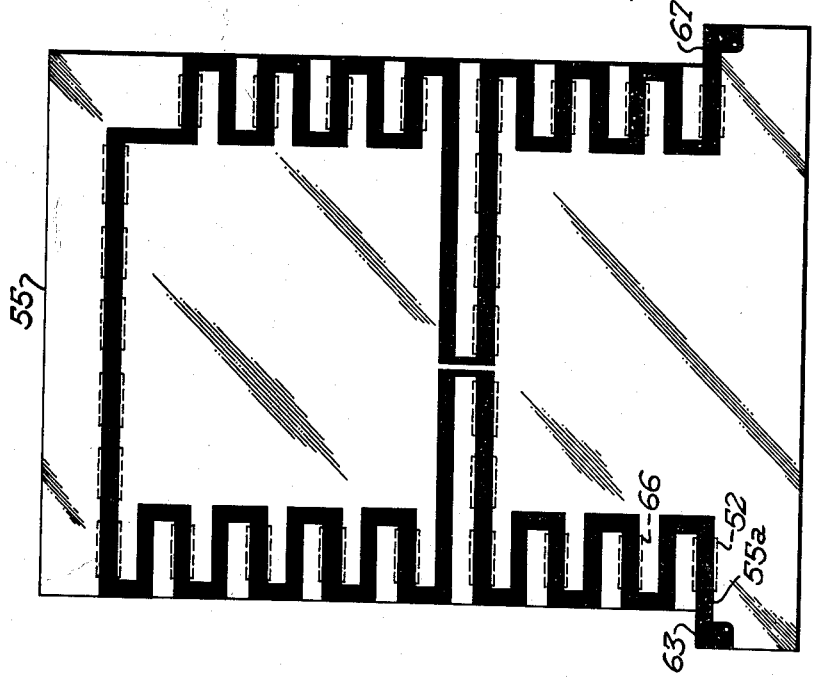

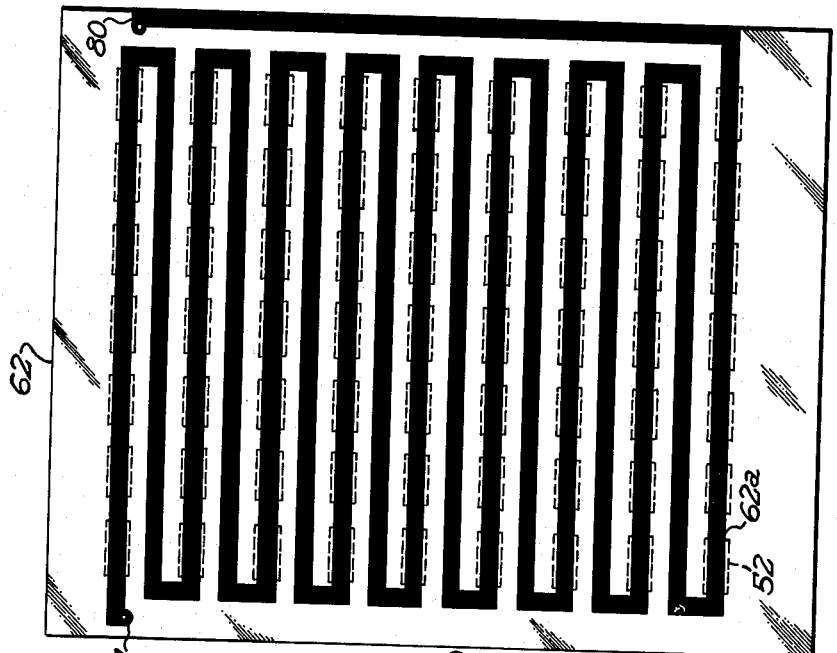
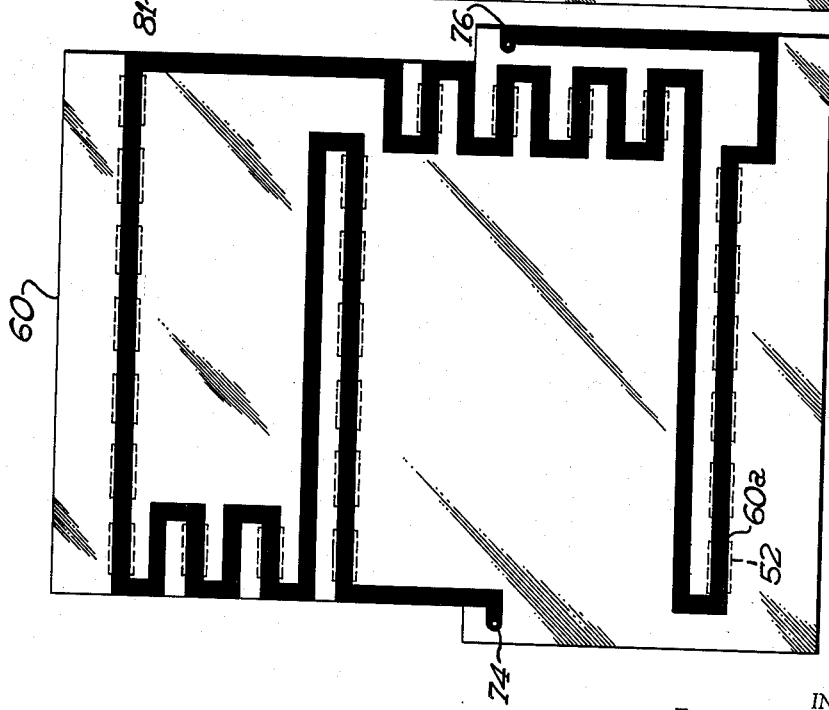

June 1, 1965

J. H. TODT ETAL 3,186,115

ELECTRICAL APPARATUS

Filed May 31, 1961

INVENTORS
JOACHIM H. TODT,
ARTHUR H. JOHNSON
BY
Kenneth D. Siegfried
Everett J. Schroeder
THEIR ATTORNEYS

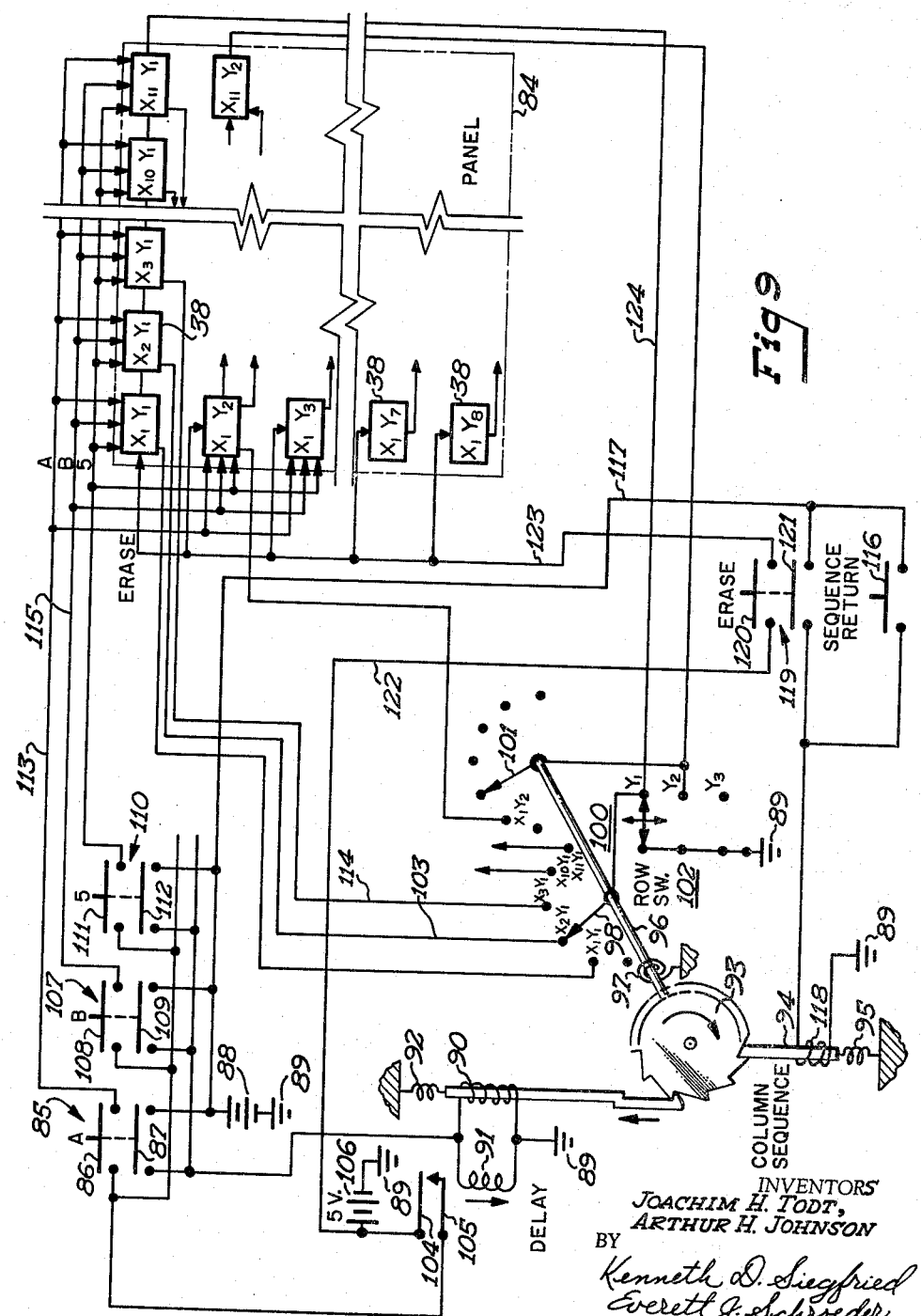

3,186,115
ELECTRICAL APPARATUS
Joachim H. Todt and Arthur H. Johnson, both of Minneapolis, Minn., assignors to Maico Electronics, Inc., Minneapolis, Minn., a corporation of Minnesota
Filed May 31, 1961, Ser. No. 113,851
10 Claims. (Cl. 40—28)

This invention relates to the field of electrical apparatus and more particularly to the field of visual display apparatus.

This invention is an improvement upon co-pending application Serial Number 88,881 now Patent No. 3,161,726, filed February 13, 1961 and assigned to the same assignee. Our invention contemplates the use of well established principles that when a magnetic element is placed in a magnetic field, similar poles repel and dissimilar poles attract each other. Therefore, by using a symmetrical pattern of small light reflecting elements which have magnetic properties and manipulating them in the magnetic field, a display panel can be fabricated which avoids the disadvantages of present day display panels and yet provides a highly efficient display panel. Specifically, our invention contemplates using a plurality of reflectors which are made from a thin film material having magnetic properties which can be moved from a first predetermined position to a second predetermined position and thereby direct light, toward or away from, an observer depending upon the angle of incidence between the light source and the reflective elements. In order to control the plurality of reflective elements, they are arranged in columns and rows and are actuated individually by a current carrying conductor representative of certain images such as letters of the alphabet, numerals, and other symbols as found on typewriter keyboards weather forecasting maps, etc.

Our panel may be made in different forms, all utilizing the same principle that the magnetic and reflective elements will be either attracted or repelled by an adjacent magnetic field. To produce panels of larger dimension, several modules or small panels may be combined in a sequential operation to produce panels in varying sizes and forms.

We have found that for certain applications of the panel in which alpha-numeric presentations are desired, that the panel which was described in the co-pending application referenced above, may be simplified and made in such a manner as to lend itself to more productive manufacturing techniques. However, it may be desirable to use vacuum deposition methods or certain methods of vapor deposition and printed circuit techniques in producing our panel.

The panel which we contemplate as illustrative of our invention has the property of providing a "memory" once the image is displayed upon the panel. That is, after the symbol or character is written upon the panel it will remain on the panel until it is "erased." The characters or images which are to be written on the panel are written across the panel from left to right using an appropriate keyboard much like a typewriter or teletype machine and after the first row is completed the second row may be written until the entire message or display of characters is presented on the panel. At any one time, should it be desirable to remove the images placed on the panel, an erase function may be performed in which the images are removed from the panel, individually, or by rows and columns or both.

It is therefore a general object of the present invention to provide an improvement in the field of data display panels and particularly in the area of panels which display alpha-numeric characters and symbols.

It is another object of the present invention to provide a display panel having a "memory" function.

It is another object of this invention to provide a display panel using external lighting.

It is still another object of the present invention to provide a display panel operating on magnetic principles and using thin films which display magnetic properties.

It is yet another object of the present invention to provide a panel using one form of control for writing the characters and a second form of control for erasing the characters.

It is yet another object of the present invention to provide a panel in combination with scanning means to display the desired characters.

It is yet another object of the present invention to provide a panel which is made up of a number of modules which are easily replaceable should one become damaged.

It is still a further object of the present invention to provide a display panel using electrical conductors which interconnect the magnetic elements by forming them from printed circuit sheets.

These and other features of the invention will become more apparent from the accompanying drawings where similar reference characters designate corresponding parts and in which:

FIGURE 3 is a cross section of the panel showing one reflective element and associated magnetic circuit in detail;

FIGURE 4 is a printed circuit sheet having a conductor etched thereon which will form the letter "A" on the panel;

FIGURE 5 is a printed circuit sheet having a conductor formed thereon in the shape of the letter "B" when displayed on the panel;

FIGURE 6 is a printed circuit sheet having a conductor etched thereon which will display the numeral five on the display panel;

FIGURE 7 is a printed circuit sheet having a single conductor etched thereon which passes through all of the magnetic structure of the particular panel to form an erasing circuit;

FIGURE 9 is a schematic drawing and partial drawing of the panel showing one embodiment in part, for actuating the panel.

Figure 2:
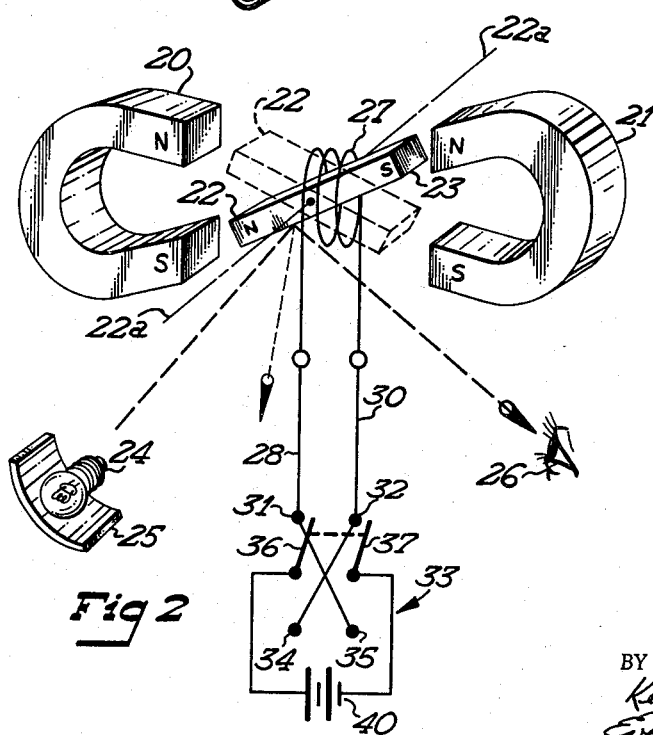
FIGURE 2 is an illustrative diagram showing the general principles of operation of the invention.

The general principles of operation of our invention can best be understood by turning to the drawing of FIGURE 2. A pair of magnets 20 and 21 are shown which are generally in a horseshoe or U shaped form with the pole piece at the open end of the horseshoe or U shape. Each magnet has a north and south pole on the open end of the horseshoe magnets with the north poles opposing each other and the south poles opposing each other. Situated between magnets 20 and 21 is a bar 22 also having magnetic properties. That is, bar 22 is made of a material which will retain a magnetic field when such a field is impressed upon the element. Furthermore, bar 22 has reflective surface 23 which is generally shown on the roller side of the bar 22. Situated below magnet 20 and below bar 22, is a light source 24 having a reflector 25 which has a general parabolic shape. Light 25 directs the light from source 24 towards light reflective surface 23 so that for certain positions of bar 22, light is reflected away from surface 23 and generally to the right under magnet 21, towards the position and observer might take designated by reference numeral 26. Encompassing bar 22 is a coil 27 which has a pair of connecting leads 28 and 30. Leads 28 and 30 are respectively connected to a pair of terminals 31 and 32 of a double pole double throw switch 33. Another pair of terminals 34 and 35 are connected to terminals 32 and 31 respectively and a pair of switch arms 36 and 37 are connected to a battery 40, the switch arms being insulatedly connected together. Switch 33 is wired in the form of a reversing switch so that current may be caused to flow towards coil 27 in connecting lead 28 for one cycle of operation and towards coil 27 through connecting lead 30 for another cycle of operation. The cycle of operation is controlled by the position switch arms 36 and 37. Applying the magnetic right hand rule, if current is caused to flow in connecting lead 28 towards coil 27, a field will be established in which a north pole is created (assuming this to be the positive pole) at the left hand side of element 22 and a south pole will be created at the right end of element 22. In like manner, upon a reversal of the current so that it flows towards coil 27 through conducting lead 30, the north and south poles are reversed. Applying the principles of magnetic fields, if element 22 is magnetized such that the left end is magnetized north it will be magnetically attracted to the south pole of magnet 20 such as is shown in the solid line diagram. Similarly magnet 21 will have its north pole opposite the south pole of element 22. If the material of element 22 is such that it will retain a certain magnetic field, this field will aid in keeping element 22 positioned between the attracting poles of magnets 20 and 21. When switch 33 is reversed, element 22 will have its field reversed and the magnetic poles which will also reverse, will now be repelled and attracted towards the other legs of the horseshoe magnets 20 and 21. For our particular application, there is no coil such as coil 27 attached to the element but the conductor which aids the magnetic field is adjacent element 22 and element 22 is allowed to pivot or rotate about its axis 22a. It should become apparent that by manipulation of the magnetic pole pieces of magnets 20 and 21 that the angle through which element 22 is rotated can be increased or decreased and this magnetic field may be shifted by increasing or shading the magnetic field created by the permanent magnets. Positioning of the coil 27 behind element 22 or adjacent the air gaps between element 22 and the pole pieces of magnets 20 and 21 has the same effect as positioning the coil 27 about element 22.

Figure 1:
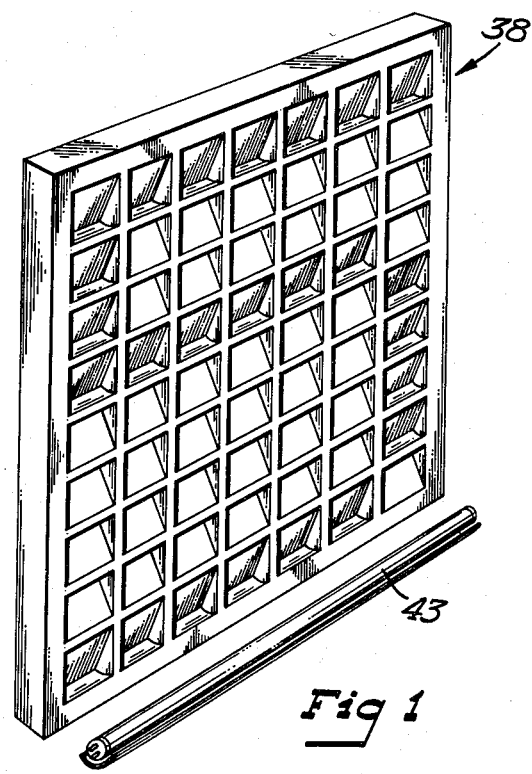
FIGURE 1 is a perspective view of the front of the panel which forms a module which reflecting elements actuated to form the numeral five.

In FIGURE 3, a thin film sheet 39 has a rotatable element 41 formed therein which has a reflective surface 42 on its front face. The manner in which reflecting elements 41 are rotated can best be seen by referring to FIGURE 1 in which a panel 38 is shown with 25 of the reflective elements having reflective surface 42 are rotated so that light which is received from a source 43 is reflected to produce the image or character 5. It will be noted in viewing panel 38 that those elements which do not reflect the light are all rotated so as to cast the light away from the observer or produce no visible image. Thin film 39 may be made of molybdenum permalloy which is a nickel-iron compound ranging in thickness from $0.50 \times 10^{-3}$ to $0.125 \times 10^{-3}$ inches in thickness. It will of course be understood that different thicknesses may be used for certain applications. The molybdenum permalloy contains a reflective surface such as surface 42 and element 41 is formed by etching or cutting away the sheet of permalloy to provide a clearance for the reflective element and yet retain a horizontally centered portion which makes up a hinge so that element 41 is rotated about a central axis 44. A pair of magnets 45 and 46 clamp thin film sheet 39 at its upper portion and a pair of magnets 47 and 48 clamp thin film sheet 39 at its lower portion. Magnets 45, 46, 47, and 48 may be formed of a material such as Lodex, which comprises approximately 50% lead and 50% elongated single domain iron or a compound of gamma-ferric oxide imbedded in polyethylene may prove suitable. Magnets 45 through 48 may be made in the shape of a bar having its sides curved which are adjacent the edge of element 41 to form a uniform air gap. Magnets 45 and 47 are held in place by a sheet of plexiglass 50 or some other suitable light transmitting material which has a pair of recessed or notched portions in which magnets 45 and 47 are fitted. Situated behind thin film sheet 39 and reflective element 41 is another sheet of plastic material 51 which does not have to be transparent and which has a pair of notches or recessed portions to fixedly hold magnets 46 and 48. Sheets 50 and 51 are fixedly clamped together by any suitable means (not shown) in order to insure that magnets 45 and 46 and magnets 47 and 48 cooperate with thin film sheet 39 as well as securing thin film sheet 39 along its edges to fixedly clamp and support element 41. This is accomplished by a pair of depending portions 50a and 51a which hold the edge of sheet 39 therebetween in sandwich manner. Situated behind reflecting element 41 is a U shaped member 52 which is shown broken for the reasons to be set forth, the element being made of material such as transformer lamination stock or similar material which is highly capable of being magnetized. Magnetizable element 52 is fittted into a pair of slots 53 and 54 which are cut in plastic member 51 at right angles to thin film sheet 39 so that one leg of U shaped member 52 is behind and adjacent to reflecting element 41 and magnet 46 respectively. The portion which extends through slot 53 of magnetizable element 52 is of longer length than that extending through slot 54, so that one leg of element 52 is projected into close relationship to thin film 39 at hinge 44. There is an air gap which exists between the ends of U shaped element 52 and reflective element 41. It will be noted that the air gaps are approximately of the same dimensions. Situated behind plastic sheet 51 are a plurality of printed circuits 55, 56, 57, 58, 59, 60, 61, and 62. Since magnetizable element 52 is shown in broken relief, the number of printed circuits which may be positioned behind plastic sheet 51 is determined only by the physical limitations to which the panel is to be applied and magnetizable element 52 may have its legs varied in length to insure that the closed portion of the U shaped member is placed behind the last sheet of the printed circuits. Printed circuit members 55 through 62 may be formed of a sheet of copper clad mylar or from any other low resistance metal clad plastic sheets wherein the conductors etched on one sheet are insulated from another. It will be noted that certain of the copper clad mylar sheets have conductors etched thereon which pass through the U shaped portion of magnetizable element 52 and these are designed as 56a, 58a, 60a, and 62a of printed circuit sheets 56, 58, 60, and 62 respectively. As will be seen later, U shaped element 52 may be that element which encompasses the conductor in the lower left hand corner of FIGURES 4, 5, 6, and 7 and which is specifically shown in FIGURE 8.

Referring to FIGURE 4, it will be seen that copper clad mylar sheet 55 has etched thereon a pattern which is an elected conductor 55a that is directed through the U shaped magnetizable elements so that a current may be conducted through the conductor to provide an additional magnetic field which can be combined with the magnetic field produced about the magnets such as magnets 45, 46, 47, and 48. An end terminal 63 is provided on sheet 55 which is connected to a plug in electrical connector 64 by a connecting lead 65. Current is then conducted through etched conductor 55a which is encompassed by magnetizable element 52 so that current passes from left to right and is again returned to the left and directed upward so that current may flow in the same direction while being encompassed by a similar U shaped magnetizable element which for convenience is shown as a dashed line 66. It will be noted that current is always conducted in the same direction to cause the reflective elements 41 to be rotated so that they produce a particular character or symbol. In the case of sheet 55, the letter A is formed because of the particular magnetizable elements which are energized. The circuit is completed by having another terminal 67 on the opposite side of sheet 55 from terminal 63 which is also connected to connector 64 by a lead 68. Connector 64 is fixedly fastened to the frame member of panel 38 through a bracket 69 by suitable connecting means such as screws.

In like manner, sheet 58 has etched thereon a conductor 58a which passes through those U shaped magnetizable elements which are to be used to form the letter B. A terminal 70 is connected to plug in connector 64 through a lead 71 and the other end of conductor 58a terminates in a terminal 72 on the opposite side of sheet 58. Terminal 72 is connected to connector 64 through a connecting lead 73. It may be seen that all the letters of the alphabet, numerals, or any particular symbols desired may be created by so routing conductors such as 55a or 58a to produce the desired character or image upon the panel.

Referring to FIGURE 6, it will again be seen that conductor 60a which passes through U shaped member 52, conducts current from the left to the right and in so doing creates the figure 5 upon the panel. A terminal 74 from the left side of sheet 60 is connected to connector 64 through a connecting lead 75. The other end of conductor 60a is connected to a terminal 76 which in turn is connected to conductor 64 through a connecting lead 77. It will also be noted in FIGURE 8, that locating pins 78 are used to insure that the different sheets upon which the characters are etched are properly located with respect to the slots cut therein, through which pass the U shaped magnetizable elements such as 52. Sheet 60 creates the numeral 5 and it will become apparent that any of the digits may be created in like manner.

FIGURE 7 shows sheet 62 which is used to erase any character or symbol which is present on that particular panel or module if used with a group of panels such as just described. In this case, however, conductor 62a has current passed through a terminal 80 which is on the side opposite the input terminals of the other sheets so that current is then passed from right to left in going through the conductor encircled by the magnetizable elements such as 52 to cause reverse motion of reflective elements 41 and thereby return all of the reflective elements to one condition. It will be seen that conductor 62a passes through all of the magnetizable elements thereby erasing the images which appear on the panel. Conductor 62a terminates in another terminal 81 and input terminal 80 is connected to connector 64 by a lead 82 while the output terminal 81 is connected to connector 64 through a lead 83. It should now be apparent that any letter of the alphabet, numeral, symbol or other character may be created and that the definition is merely dependent upon the number of rotatable reflective elements such as 41 to created the image for the observer. It should also be apparent that once the reflective element has rotated to a position where the illuminating source has its rays reflected to the observer, that the particular character so placed upon the panel will remain until the erase function is performed.

Figure 8:
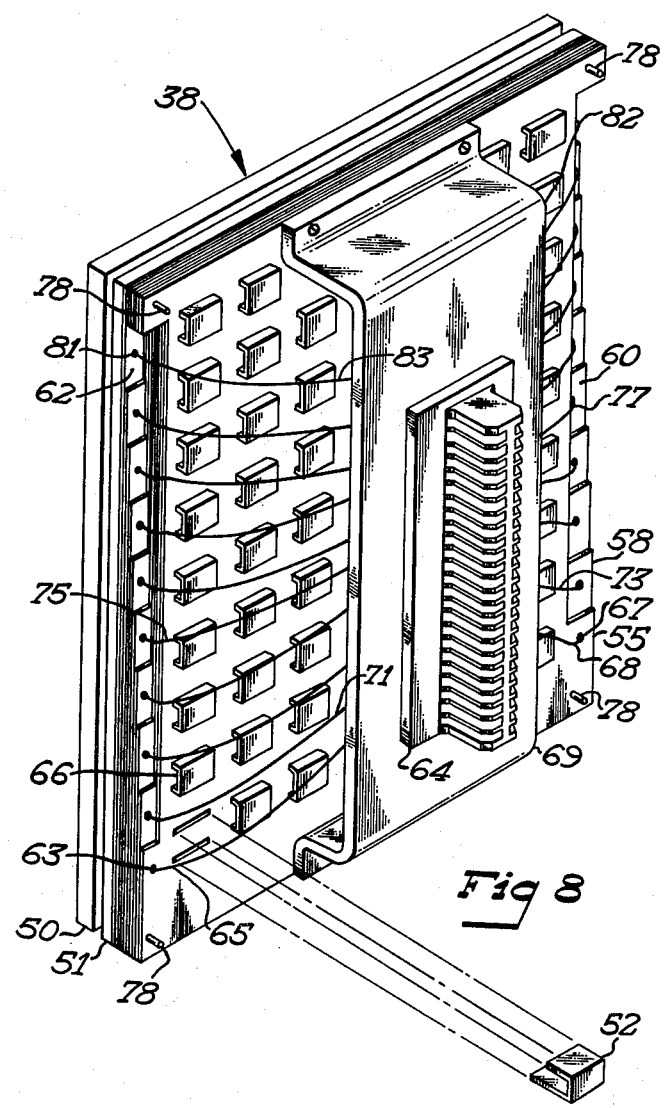
FIGURE 8 is a view of the reverse side of the panel as seen in FIGURE 1.

FIGURE 9 is directed to one embodiment of the switching circuits and scanning circuits associated with the panel where the panel itself is made up of a series of the plugs in units 38 such as shown in FIGURE 8 and each panel then becomes a module of a larger panel 84 such as that shown in FIGURE 9. As panel 84 is shown, a number of the units such as shown in FIGURE 8 are set side by side in rows and are also stacked in columns to give a panel of larger dimensions. For the embodiment shown, the panel would contain 11 modules across and 8 modules high. It of course is understood that any number may be used to fit the particular application. While not specifically shown, a keyboard such as a typewriter keyboard or teletype may be employed to depress certain switches which will create the characters upon the modules forming panel 84. For the particular embodiment shown in FIGURE 9, the characters such as the letter A, B, digit 5 and the erase functions are shown, it being understood that the additional characters may be created by merely extending the teaching as shown in this embodiment. In describing the operation of the circuit in FIGURE 9 it will be assumed that all of the modules have had the erase function performed and that the writing function will begin with the top row and left hand column. A double pole push button switch 85 has a pair of contact bars 86 and 87 which are actuated by the letter "A." Upon switch bar 87 being depressed, voltage from a battery 88 which has its negative terminal connected to a ground 89 is supplied to a pair of relay coils 90 and 91 which have their other connections made to ground 89. Coil 90 is a part of a solenoid which is actuated in the direction of the arrow which compresses a spring 92 and at the same time rotates toothed wheel in a clockwise direction. As toothed wheel 93 is rotated, a plunger 94 of an erase relay compresses a spring 95 and holds the toothed wheel in its new position. A shaft 96 which is connected to toothed wheel 93 has a spiral spring 97 connected thereto which opposes the rotation so that upon the proper energization of return relay and movement of solenoid plunger 94, toothed wheel 93 may be returned to its rest position. For purposes of illustration, it will be assumed that the first module $X_1Y_1$ has already had a character written upon it and that upon depressing double pole push button switch 85 toothed wheel 93 will have advanced two notches and a switch arm 98 will now be in contact with a contact designated as $X_2Y_1$ of a stepping switch 100. In like manner, a second switch arm 101 engages a contact which would be $X_2Y_2$. A row switch 102 has one terminal connected to ground 89 and the switch arm is rotatable to a plurality of contacts designated as $Y_1$, $Y_2$, $Y_3$, etc. Switch arm 98 is connected to terminal $Y_1$ designating it as row 1 and switch arm 101 is connected to terminal $Y_2$ designating it as row 2. Thus when row switch 102 has terminal $Y_1$ connected to ground, an electrical path is formed from ground 89 through switch terminal $Y_1$, switch arm 98 and a connecting lead 103 which connects all of the printed circuit sheets such as shown in FIGURES 4, 5, 6, and 7 of module $X_2Y_1$ to ground. Relay coil 91 has a delayed action and closes an armature 104 against a contact 105 so that a voltage which is supplied by a battery 106 is connected through armature 104 and contact 105 to a contact which is to be mated with switch arm 86. Another push button switch 107 has a pair of switch arms 108 and 109 and another double pole push button switch 110 has a switch arm 111 and another switch arm 112. Push button switch 107 is actuated by the letter "B" and push button switch 110 is actuated by the numeral "5." One terminal of switch 110 associated with switch bar 111 and another terminal of switch 107 associated with switch bar 108 are connected in parallel to relay contact 105 as just described. As switch bar 86 of switch 85 is depressed, the circuit is completed from contact 105 through a connecting lead 113 to all the modules 38 in panel 84 such as those designated $X_1Y_1$, $X_2Y_1$, $X_1Y_3$, etc. It will be remembered however that module $X_2Y_1$ had one terminal of all of its printed circuit sheets connected to ground through lead 103, switch arm 98, and row switch 102 so that the letter A would then appear on module $X_2Y_1$. For the sake of illustration, let it be assumed that the letter B should next appear on module $X_3Y_1$ and this will be accomplished by depressing push button 107 wherein switch bar 109 supplies voltage from battery 88 to coil 90 of the column sequencing stepping switch to advance switch arm 98 from terminal $X_2Y_1$ to terminal $X_3Y_1$ so that a ground path is created through a connecting lead 114 for module $X_3Y_1$. At the same time, coil 91 is energized causing armature 104 to make contact with terminal 105 and since switch bar 103 is connected to terminal 105, voltages supplied to module $X_3Y_1$ to a common lead 115. It may now be seen that any particular symbols or characters may be created by tying all of the particular letters, numerals, or symbols together by a parallel circuit arrangement so that voltages supplied to each module, but only that module which is to have the character written upon it has the circuit completed to ground and therefore the others are not effected. After the last module has the character written upon it such as module $X_{11}Y_1$, the next row must then be written and this is done by depressing the sequence return switch having a switch bar 116 which makes contact with a terminal connected to battery 88 to a connecting lead 117 and completing the circuit to the other terminal to a coil 118 of an erase solenoid which has the other end of coil 118 connected to ground 89. When coil 118 is energized, spring 95 is depressed and return spring 97 uncoils to turn shaft counterclockwise and return switch arms 98 and 101 to their rest positions. Upon coil 118 being de-energized, spring 95 again forces plunger 94 into engagement with the teeth of toothed wheel 93.

If a mistake is made in writing the particular letter, numeral, or character in a given row, the row may be erased. It of course is understood that for some applications it may not be desirous to erase the entire row and that it would not require invention to provide such features in order to allow erasing only one module rather than all of the modules in a particular row. An erase push button switch 119 has a pair of switch bars 120 and 121 which are ganged together and when switch bar 120 is depressed it engages a terminal which is connected to voltage source 106 through a connecting lead 122 and engages a second terminal so that the voltages supplied to all of the modules in panel 84 through a connecting lead 123. All of the erase circuits for each row are interconnected and the remaining terminal for row $Y_1$ is connected to terminal $Y_1$ of row switch 102 through a connecting lead 124. Thus when switch bar 120 is depressed a voltage of opposite polarity to that used to energize printed circuits producing the letters, numerals, or symbols is supplied to each module 38 to rotate all of elements 41 back to their original position and thereby erase any character created upon each of the modules. Simultaneously, a switch terminal which is engaged by switch bar 121 is connected to voltage source 88 through lead 117 and has its other terminal connected to coil 118 of the erase relay. Thus the switch arms 98 and 101 are returned to their rest position so that the row may be rewritten. It will be seen that by the use of row switch 102, that the other remaining rows are not affected by the erase function since their ground circuit is not completed.

It should be obvious to those skilled in the art that certain modifications and alterations may be made for our invention which falls in the scope of our teaching. It is anticipated that different forms of light sources may be used and that the reflecting elements may be treated in certain ways to produce different effects. From the foregoing teaching which we have set forth it will become apparent that we have shown and described a device which accomplishes the objects set forth herein.

We intend to cover all modifications and variations of our inveniton and wish to be limited only by the spirit and scope of the appended claims.

What we claim is:

1. A display panel for producing visual images for an observer comprising: a sheet of material having magnetic properties with movable light reflecting elements including supporting members formed therewith; magnetic means disposed adjacent said plurality of movable light reflecting elements and fixedly holding said sheet in sandwiched relation for controlling the position of said light reflecting elements; a plurality of magentizable elements located adjacent said magnetic means and said movable light reflecting elements and adapted to be controlled by an external signal applied thereto to control the movement of said light reflecting elements; a plurality of image forming conductors physically arranged in the shape of the image to be formed for conducting current in a first direction and interconnecting certain of said plurality of magnetizable elements in a predetermined pattern to produce an additional magnetic field to cause said elements to be moved so that light is directed towards such observer whereby images are produced on said panel; and an image erasing conductor interconnecting all of said magnetizable elements for conducting current in a direction opposite to said first direction so that light is directed away from such observer whereby images are erased from said panel.

2. A display panel for producing visual images for an observer comprising: a sheet of material having magnetic properties with movable light reflecting elements including supporting members formed therewith; magnetic means disposed adjacent said plurality of movable light reflecting elements and fixedly holding said sheet in sandwiched relation including a plurality of magnetizable elements adapted to be controlled by an external signal applied thereto to control the movement and position of said light reflecting elements; a plurality of image forming conductors, each distinct from the other and arranged in the shape of the image to be formed for actuating and interconnecting certain of said plurality of magnetic means in a predetermined pattern to produce an additional magnetic field to cause said elements to be moved; an image erasing conductor interconnecting all of said magnetic means for actuating said magnetizable elements in a sense opposite to that provided by said image forming conductors; and energizing means connected to said plurality of image forming conductors and said image erasing conductor for energizing said image forming conductors and said image erasing conductor so that light is directed towards such observer to produce images on said panel and is directed away from said observer to erase images from said panel.

3. A display panel for producing visual images for an observer comprising: a sheet of material having magnetic properties with movable light reflecting elements including supporting members formed therewith; magnetic means disposed adjacent said plurality of movable light reflecting elements and fixedly holding said sheet in sandwiched relation for controlling the position of said light reflecting elements; a plurality of magnetizable elements located adjacent said magnetic means and said movable light reflecting elements and adapted to be controlled by an external signal applied thereto to control the movement of said light reflecting elements; a plurality of image forming conductors, each distinct from the other and arranged in the shape of the image to be formed for actuating and interconnecting certain of said plurality of magnetizable elements in a predetermined pattern to produce an additional magnetic field to cause said elements to be moved; an image erasing conductor interconnecting all of said magnetizable elements for actuating said magnetizable elements in a sense opposite to that provided by said image forming conductors; first energizing means connected to said plurality of image forming conductors for energizing said image forming conductors so that light is directed towards such observer whereby images are produced on said panel; and second energizing means having a polarity opposite to that of said first energizing means for energizing said image erasing conductor so that light is directed away from such observer whereby images are erased from said panel.

4. A display panel for producing visual images for an observer comprising: a thin film sheet having magnetic properties with movable thin film light reflecting elements including supporting members formed therein, said elements being arranged in columns and rows; magnetic members forming a frame at the top and bottom of each of said plurality of thin film movable light reflecting elements and fixedly holding said thin film sheets in sandwiched relation for controlling the rotational position of said light reflecting elements; a plurality of U shaped magnetizable elements located behind said magnetic members and said movable light reflecting elements and adapted to be magnetized by an external signal to control the rotational movement of said light reflecting elements; a plurality of image forming conductors, each distinct from the other for energizing and interconnecting certain of said plurality of magnetizable elements in a predetermined pattern to produce an additional magnetic field to cause said elements to be moved; an image erasing conductor interconnecting all of said magnetizable elements for energizing said magnetizable elements in a sense opposite to that provided by said image forming conductors; first intermittently controlled energizing means connected to said plurality of image forming conductors for intermittently energizing said image forming conductors so that light is directed towards such observer whereby images are produced on said panel, and second energizing means having a polarity opposite to that of said first intermittently controlled energizing means for energizing said image erasing conductor so that light is directed away from such observer whereby images are erased from said panel.

5. The invention as set forth in claim 4 including a pair of plastic plates, at least one of which is transparent for fixedly encompassing said magnetic members and supporting said plurality of supporting members and said U shaped magnetizable elements.

6. The invention as set forth in claim 1 including a light source positioned outside said magnetic means and directing its light rays towards said light reflecting elements so that said light reflecting surface is illuminated in a first predetermined position and non-illuminated in a second predetermined position.

7. The invention as set forth in claim 1 wherein said plurality of image forming conductors and said image erasing conductor are formed from adjacently positioned low resistance metal clad plastic sheets.

8. A display panel for producing visual images for an observer comprising: a sheet of material having magnetic properties with movable light reflecting elements including supporting members formed therewith; magnetic means disposed adjacent said plurality of movable light reflecting elements and fixedly holding said sheet in sandwiched relation for controlling the position of said light reflecting elements; a plurality of magnetizable elements located adjacent said magnetic means and said movable light reflecting elements and adapted to be controlled by an external signal applied thereto to control the movement of said light reflecting elements; a plurality of image forming conductors, each distinct from the other for conducting current in a first direction and interconnecting certain of said plurality of magnetizable elements in a predetermined pattern to produce an additional magnetic field to cause said elements to be moved so that light is directed towards such observer whereby images are produced on said panel; an image erasing conductor interconnecting all of said magnetizable elements for conducting current in a direction opposite to said first direction so that light is directed away from such observer whereby images are erased from said panel; a frame member having a transparent face for fixedly holding and encasing said magnetic means and said light reflecting elements; and a multiple conductor plug attached to said frame member and electrically connected to said plurality of image forming conductors and said image erasing conductor and adapted for use with a mating plug so that said panel is readily replaceable.

9. The invention as set forth in claim 2 wherein said plurality of movable light reflecting elements, said magnetic means, said plurality of image forming conductors, and said image erasing conductor form a module of which a plurality are arranged in columns and rows to form said display panel; and wherein said energizing means includes switching means for sequential switching of electrical energy from module to module by column and row so that an image may be created and erased if necessary, for each module of said panel.

10. The invention as set forth in claim 1 wherein there is one image forming conductor for each character and symbol which is to be displayed on said display panel, each of which conducts current in said first direction.

References Cited by the Examiner
UNITED STATES PATENTS
3,025,512   3/62   Bloechl _____ 340—378

JEROME SCHNALL, *Primary Examiner.*
E. V. BENHAM, *Examiner.*